(No Model.)

R. H. TERHUNE.
SLAG AND MATTE POT.

No. 323,541. Patented Aug. 4, 1885.

WITNESSES:
E. B. Bolton
Geo. Sainson

INVENTOR:
Richard H. Terhune
By his Attorneys,
Burke, Fraser & Bennett

UNITED STATES PATENT OFFICE.

RICHARD H. TERHUNE, OF SALT LAKE CITY, UTAH TERRITORY.

SLAG AND MATTE POT.

SPECIFICATION forming part of Letters Patent No. 323,541, dated August 4, 1885.

Application filed May 4, 1885. (No model.)

*To all whom it may concern:*

Be it known that I, RICHARD H. TERHUNE, a citizen of the United States, and a resident of Salt Lake City, in the Territory of Utah, have invented a certain new and useful Improvement in Slag and Matte Pots, of which the following is a specification.

In the manufacture of base bullion and lead and copper matte, the slag and matte are drawn from a furnace into a conical-shaped vessel or pot of cast-iron. The molten matte is an extremely fluid sulphuret, having great affinity for cast-iron, which it corrodes very rapidly. The molten matte, being of much greater specific gravity than the slag, settles to the bottom of the iron pot, so that its corrosive action affects principally the bottom of the pot, rapidly destroying it and producing radial fractures. The extreme fluidity of the matte causes it to flow through the smallest fissures, so that when a pot is thus fractured it becomes useless for this purpose. These iron pots are very costly, and a great many of them are required to equip an ordinary smelting-furnace, so that their rapid destruction is a considerable source of loss, which it is the object of my present invention to reduce.

Figure 1:
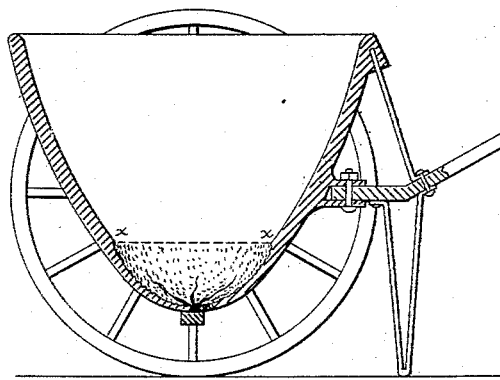
Figure 2:
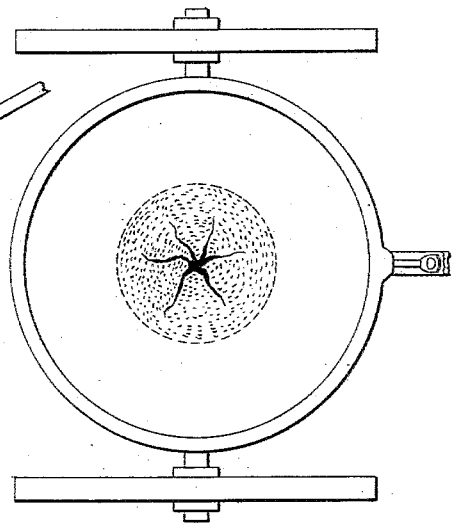

Figures 1 and 2 of the accompanying drawings show one of the pots or bowls, as heretofore made, after it has been corroded or cracked by the matte, the former figure being a vertical mid-section and the latter a plan view. In the latter the radial cracks in the bottom of the vessel are clearly seen. The matte usually fills the bottom of the pot to the level of the line $x\,x$, below which line the corrosion takes place, being greatest at the central portion of the bottom. The pot is hung between wheels, as shown, for convenience in handling.

Figure 3:
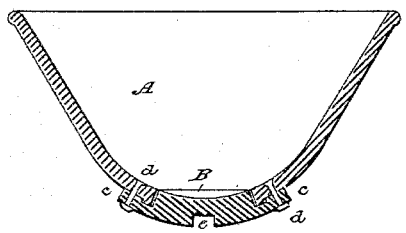
Figure 4:
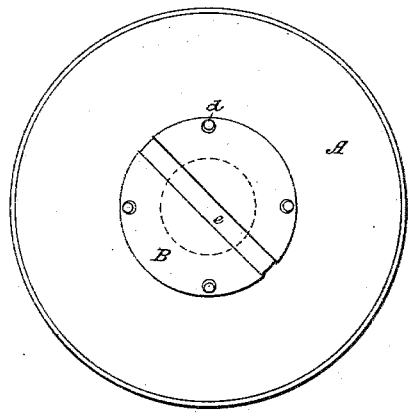

Fig. 3 is a vertical mid-section of my improved pot; and Fig. 4 is an inverted plan thereof.

My invention consists in constructing the pot with its bottom in a separate piece from its upper portion, so that when this bottom becomes corroded it may be removed and replaced by another without throwing away the entire pot. The upper portion, A, of the pot is cast without a bottom, and a separate bottom plate or section, B, is made to fit it. The two may be fastened together by any known means—such as by pins, lugs, set-screws, rivets, bolts, or keys. I prefer, however, to make the bottom plate, B, with a flange, $c$, which laps over the bottom portion of the pot A, and to fasten the two together by screws $d\,d$ passing through this flange, as shown.

The bottom plate, B, may be made of cast-iron, the same as the remainder of the pot, or of any other suitable material.

I claim as my invention—

1. A slag and matte pot constructed with a removable bottom, substantially as and for the purposes set forth.

2. The combination of the bottomless pot A, with a bottom plate or section, B, fitting the bottom opening of the pot, and formed with a flange, $c$, overlapping the pot, as set forth.

In witness whereof I have hereunto signed my name in the presence of two subscribing witnesses.

RICHARD H. TERHUNE.

Witnesses:
CLARK H. PARSONS,
WILLIAM T. BARBEE.